United States Patent
Wassing et al.

(10) Patent No.: US 10,308,863 B2
(45) Date of Patent: Jun. 4, 2019

(54) FORMATION PRECONDITIONING USING AN AQUEOUS POLYMER PREFLUSH

(71) Applicant: SHELL OIL COMPANY, Houston, TX (US)

(72) Inventors: Leonardus Bartholomeus Maria Wassing, Rijswijk (NL); Esther Christianne Maria Vermolen, Rijswijk (NL); Mark Theodoor Looijer, Rotterdam (NL); Bartholomeus Marinus Josephus Maria Suijkerbuijk, Utrecht (NL)

(73) Assignee: SHELL OIL COMPANY, Houston, TX (US)

( * ) Notice: Subject to any disclaimer, the term of this patent is extended or adjusted under 35 U.S.C. 154(b) by 469 days.

(21) Appl. No.: 14/850,478

(22) Filed: Sep. 10, 2015

(65) Prior Publication Data

US 2016/0075936 A1    Mar. 17, 2016

Related U.S. Application Data

(60) Provisional application No. 62/050,514, filed on Sep. 15, 2014.

(51) Int. Cl.
*C09K 8/588* (2006.01)
*E21B 43/16* (2006.01)

(52) U.S. Cl.
CPC .............. *C09K 8/588* (2013.01); *E21B 43/16* (2013.01)

(58) Field of Classification Search
CPC ............ C09K 8/58; C09K 8/588; E21B 43/16
See application file for complete search history.

(56) References Cited

U.S. PATENT DOCUMENTS

| | | | | |
|---|---|---|---|---|
| 3,788,399 A | * | 1/1974 | Feuerbacher | C09K 8/845 166/270.1 |
| 4,074,755 A | * | 2/1978 | Hill | C09K 8/584 166/252.1 |
| 4,194,564 A | * | 3/1980 | Schievelbein | C09K 8/584 166/270.1 |
| 4,262,746 A | * | 4/1981 | Hammett | C09K 8/588 166/275 |
| 7,987,907 B2 | * | 8/2011 | Collins | C09K 8/58 166/252.3 |

(Continued)

FOREIGN PATENT DOCUMENTS

| | | |
|---|---|---|
| EP | 2604636 | 6/2013 |
| WO | 2011100136 | 8/2011 |

OTHER PUBLICATIONS

Levitt et al., Selection and Screening of Polymers for Enhanced-Oil Recovery, Society of Petroleum Engineers, SPE113845 (2008), 18 pages.

(Continued)

*Primary Examiner* — Zakiya W Bates
*Assistant Examiner* — Crystal J Miller

(57) ABSTRACT

A method of producing fluid from a formation containing hydrocarbons in which an aqueous polymer preflush fluid is injected into the formation followed by injection of an aqueous polymer displacement fluid, where the aqueous polymer preflush fluid has a total dissolved solids content that is greater than the total dissolved solids content of the aqueous polymer displacement fluid.

14 Claims, 2 Drawing Sheets

(56) References Cited

U.S. PATENT DOCUMENTS

| | | | | |
|---|---|---|---|---|
| 2010/0012331 A1* | 1/2010 | Larter | ............... | C09K 8/58 |
| | | | | 166/401 |
| 2011/0306525 A1* | 12/2011 | Lighthelm | ............... | C09K 8/58 |
| | | | | 507/225 |
| 2012/0067570 A1* | 3/2012 | Pone | ............... | E21B 43/20 |
| | | | | 166/270.1 |
| 2013/0081822 A1* | 4/2013 | Han | ............... | C09K 8/588 |
| | | | | 166/369 |

OTHER PUBLICATIONS

Bilhartz et al., Field Polymer Studies, Society of Petroleum Engineers, SPE 5551 (1975), 14 pages.

\* cited by examiner

FORMATION PRECONDITIONING USING AN AQUEOUS POLYMER PREFLUSH

This application claims the benefit of U.S. Provisional Application No. 62/050,514 filed Sep. 15, 2014, which is incorporated herein by reference.

FIELD OF INVENTION

The present disclosure relates to systems and methods for enhanced recovery of hydrocarbons from a subterranean formation. In particular, the present disclosure relates to systems and methods for driving hydrocarbon recovery through injecting fluid into a hydrocarbon bearing formation.

BACKGROUND

Oil accumulated within a subterranean oil-bearing formation is recovered or produced therefrom through wells, called production wells, drilled into the subterranean formation. A large amount of such oil may be left in the subterranean formations if produced only by primary depletion, i.e., where only formation energy is used to recover the oil. Where the initial formation energy is inadequate or has become depleted, supplemental operations, often referred to as secondary, tertiary, enhanced or post-primary recovery operations, may be employed. In some of these operations, a fluid is injected into the formation by pumping it through one or more injection wells drilled into the formation, oil is displaced within and is moved through the formation, and is produced from one or more production wells drilled into the formation. In a particular recovery operation of this sort, seawater, field water or field brine may be employed as the injection fluid and the operation is referred to as a waterflood. The injection water may be referred to as flooding liquid or flooding water as distinguished from the in situ formation, or connate, water. Fluids injected later can be referred to as driving fluids. Although water is the most common, injection and drive fluids can include gaseous fluids such as air, steam, carbon dioxide, and the like.

A polymer additive may be added to an aqueous injection fluid to increase and/or adjust the viscosity of the injection fluid and aid in displacement of hydrocarbon compounds toward the production well. The viscosity of the injection fluid is usually selected with respect to the properties of the formation and the hydrocarbon compounds within the formation, e.g., the viscosity and/or density of the hydrocarbon compounds.

Ionically charged polymers are frequently used as viscosifying agents for such injection fluids. When using polymers containing an electrical charge, such as anionic polymers, the amount of polymer needed to achieve a given increase in viscosity decreases with a decrease in the total dissolved solids within the injection fluid. An injection fluid having a low total dissolved solids ("TDS") content, e.g. from 500 ppm to 25000 ppm TDS, may be utilized to minimize the amount of polymer to reach a desired viscosity of the injection fluid, which minimizes the cost of preparing the injection fluid.

Hydrocarbon-bearing formations may adsorb polymer from an injection fluid containing an ionically charged polymer, delaying recovery of hydrocarbons, reducing the rate of such recovery, promoting fingering of the injection fluid through the formation resulting in early breakthrough of the injection fluid at a production well, and/or increasing costs of recovery due to polymer loss. As an ionically charged polymer injection fluid is introduced into and interacts with a formation, the charged polymer adsorbs onto the formation surface until the polymer adsorption potential of rock in contact with the polymer injection fluid is reached. As a result, propagation of the polymer injection fluid through the formation may be slowed by adsorption of the polymer on to the formation and lower viscosity polymer-depleted polymer fluid may finger through the hydrocarbons in the formation resulting in early breakthrough of the injection fluid at the production well.

Furthermore, when a polymer injection fluid having a low TDS content and low polymer concentration is utilized, the amount of polymer injection fluid required to satisfy the adsorption potential of the formation is large due to the relatively small amount of polymer present in the polymer injection fluid. As polymer is adsorbed from a polymer injection fluid having a low initial polymer concentration, the polymer injection fluid front will propagate more slowly through the formation as the viscosity of the polymer injection fluid drops due to loss of polymer. Slower propagation of the injection fluid results in either a delay in oil recovery or slower rate of oil recovery. Accordingly, the efficiency and cost benefits of using an injection fluid with a lower level of total dissolved solids and corresponding lower polymer concentration must typically be weighed against the resulting increase in oil recovery time, increased fingering of the injection fluid through the hydrocarbons in the formation, and the increase in volume of polymer injection fluid required to satisfy the formation polymer adsorption potential.

SUMMARY OF THE INVENTION

The present invention is directed to a method comprising injecting a selected volume of an aqueous polymer preflush fluid having a total dissolved solids content into a formation comprising hydrocarbons through an injection well extending into the formation; after injecting the aqueous polymer preflush fluid into the formation, injecting an aqueous polymer displacement fluid having a total dissolved solids content into the formation through the injection well, wherein the total dissolved solids content of the aqueous polymer preflush fluid is greater than the total dissolved solids content of the aqueous polymer displacement fluid; and producing a produced fluid comprising hydrocarbons from the formation through a production well.

BRIEF DESCRIPTION OF THE DRAWINGS

These drawings illustrate certain aspects of some of the embodiments of the present disclosure, and should not be used to limit or define the disclosure.

Figure 1:
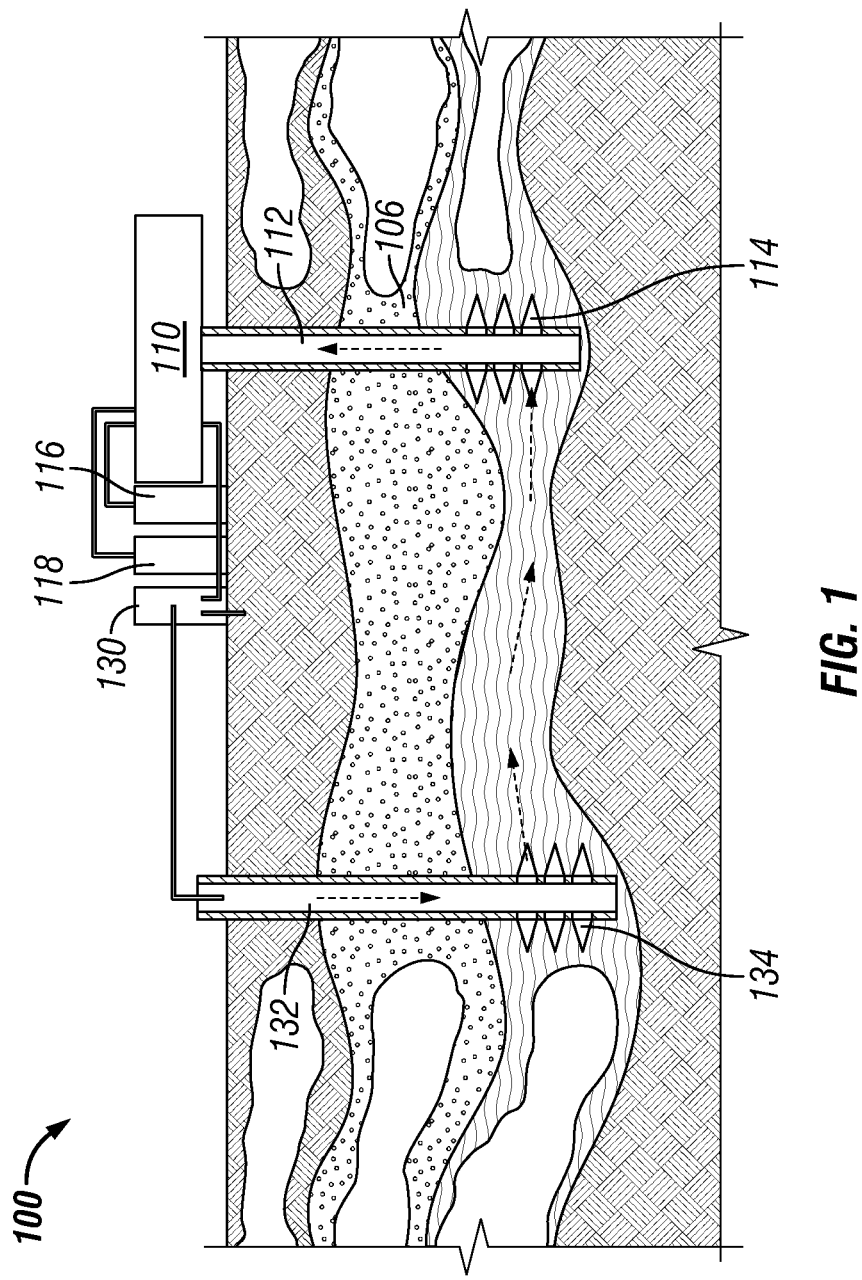
FIG. 1 illustrates an oil and/or gas production system, according to aspects of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION OF THE INVENTION

The present disclosure relates to systems and methods for enhanced recovery of hydrocarbons from a subterranean formation. In particular, the present disclosure relates to systems and methods for driving hydrocarbon recovery by injecting an ionically charged polymer-containing fluid into a hydrocarbon bearing formation.

A method is provided in which an aqueous polymer preflush fluid is injected into a hydrocarbon-bearing formation followed by injection of an aqueous polymer displacement fluid in order to drive hydrocarbon recovery from the formation, wherein the aqueous polymer displacement fluid is preferably selected to have a viscosity similar to the viscosity of the hydrocarbons in the formation at formation conditions. The polymers of the aqueous polymer preflush fluid and the aqueous polymer displacement fluid are ionically charged polymers, and may be anionic polymers. The aqueous polymer preflush fluid is used to satisfy at least a portion, and preferably all, of the polymer adsorption potential of the formation between an injection well and a production well. The total dissolved solids ("TDS") content and the polymer concentration of the aqueous polymer preflush fluid may be selected to satisfy the polymer adsorption potential of the formation more easily than the aqueous polymer displacement fluid. Accordingly, injecting a slug of the aqueous polymer preflush fluid may satisfy the formation adsorption potential more quickly than the main aqueous polymer displacement fluid, reducing the delay in oil recovery resulting from adsorption of polymer onto the formation; inhibiting fingering of the injected aqueous polymer fluids through hydrocarbons in the formation; and reducing the total volume of the aqueous polymer displacement fluid required for producing hydrocarbons from the formation.

The aqueous polymer preflush fluid and the aqueous polymer displacement fluid are fluids comprised of water and a water-dispersible, preferably water soluble, ionically charged polymer. The polymer in the aqueous polymer preflush fluid and in the aqueous polymer displacement fluid may be the same or may be different. The polymer in the aqueous polymer preflush fluid or in the aqueous polymer displacement fluid may be any ionically charged polymer usable in an enhanced oil recovery application, where the polymer is soluble or uniformly dispersable in the water. The polymer may be a homopolymer or a heteropolymer comprised of two or more monomeric units. The ratio of monomeric units of a heteropolymer may be selected to provide the aqueous polymer displacement fluid or the aqueous polymer preflush fluid with a selected viscosity in accordance with conventional knowledge in the art of mixing water-soluble or water-dispersable polymers in water. The polymer may be a water-soluble polyacrylamide or polyacrylate. The polymer may be a partially hydrolyzed polymer. A partially hydrolyzed polymer useful in the aqueous polymer preflush fluid and/or the aqueous polymer displacement fluid may have a degree of hydrolysis of from 0.1 to 0.4, or from 0.2 to 0.3. A preferred polymer for use in the aqueous polymer preflush fluid and the aqueous polymer displacement fluid is a partially hydrolyzed polyacrylamide having a degree of hydrolysis of from 0.15 to 0.4, preferably from 0.2 to 0.35. Preferred polymers for use in the aqueous polymer preflush fluid and the aqueous polymer displacement fluid are commercially available partially hydrolyzed polyacrylamides sold under the trade name of FLOPAAM™ by SNF SAS, particularly FLOPAAM™ 3330 and FLOPAAM™ 3630.

The TDS content and the amount of polymer in the aqueous polymer displacement fluid may be selected to provide the aqueous polymer displacement fluid with a selected viscosity relative to oil in place in the oil-bearing formation in which the aqueous polymer displacement fluid is to be introduced. The viscosity of a polymer solution is a function of the polymer, the TDS content of the polymer solution, the temperature of the solution, and the concentration of the polymer in the solution. The polymer, TDS content, and concentration of the polymer of the aqueous polymer displacement fluid may be selected to provide a viscosity from 2% to 500%, or from 40% to 400% of the viscosity of the oil in place in the oil-bearing formation as determined at formation temperature conditions. The viscosity of the oil in place in the formation at formation temperature conditions may be determined in accordance with conventional methods within the art. The selected viscosity of the aqueous polymer displacement fluid may range from 0.5 mPa s (cP) to 250 mPa s (cP) as measured at a temperature within the range of formation temperature conditions.

The TDS content of the aqueous polymer displacement fluid may be selected to minimize the amount of polymer required in the aqueous polymer displacement fluid to provide a desired viscosity. As noted above, in an aqueous dispersion of ionically charged polymer the amount of polymer needed to achieve a given increase in viscosity decreases with a decrease in the total dissolved solids within the injection fluid. As such, the TDS content of the aqueous polymer displacement fluid may be selected to maximize the viscosity of the fluid relative to the concentration of polymer in the fluid. The TDS content of the aqueous polymer displacement fluid may be selected to be from 250 ppm to 25000 ppm, or from 500 ppm to 20000 ppm, or from 1000 ppm to 10000 ppm. Further, increasing concentrations of divalent cations in an aqueous solution of anionically charged polymer decrease the viscosity of the solution at constant polymer concentration, therefore the concentration of divalent cations in the aqueous polymer displacement fluid, where the polymer is an anionically charged polymer, may be selected to maximize the viscosity of the aqueous polymer displacement fluid. The divalent cation content of the aqueous polymer displacement fluid may be selected to be less than 100 ppm, or less than 50 ppm, or less than 25 ppm. The TDS content and divalent cation content of the aqueous polymer displacement fluid may be provided by ionic filtration of water used to form the aqueous polymer displacement fluid, for example by nanofiltration to selectively remove divalent cations and/or by reverse osmosis to selectively adjust the TDS content.

The amount of polymer provided in the aqueous polymer displacement fluid may be selected to provide the desired viscosity to the aqueous polymer displacement fluid at the selected TDS content of the fluid. The amount of polymer in the aqueous polymer displacement fluid may be from 50 ppm up to 10,000 ppm by weight of the aqueous displacement fluid. The amount of polymer in the aqueous displacement fluid may range from 500 ppmw to 5,000 ppmw, or from 1,000 ppmw to 2,500 ppmw of the aqueous displacement fluid. When the TDS content of the aqueous polymer displacement fluid is low, for example from 500 ppm to 10000 ppm, less polymer may be needed to achieve the desired viscosity. Preferably the aqueous polymer displacement fluid having a viscosity within an order of magnitude of, and preferably substantially equivalent to, the viscosity of oil in place in the formation at formation temperature may have a TDS content of from 500 ppm to 10000 ppm and a polymer concentration of from 50 ppmw to 2500 ppmw.

The amount of aqueous polymer preflush fluid injected into a formation may be selected to satisfy at least a portion, and preferably all, of the polymer adsorption potential of the formation between an injection well and a production well. A material balance for the formation adsorption potential and the amount of polymer in the injection fluid for a given porous medium (bulk) volume V may be as follows:

$$f(C_{se})(1-\phi) \cdot V \cdot \rho_{rock} C_p(C_{se}) \cdot \rho_{sol} \cdot A \cdot \phi \cdot V \quad [1]$$

where $\phi$ is the porosity, $f(C_{se})$ is the polymer adsorption capacity (in kg of polymer adsorbed per kg rock) dependent on the TDS content and divalent cation content of the injection fluid expressed by effective salinity $C_{se}$, $\rho_{rock}$ is the rock density through which volume A (expressed in pore volume $\phi V$) of injection fluid flows, where the injection fluid has a polymer concentration $C_p$ (in kg of polymer over kg of injection fluid) dependent on the TDS content and divalent cation content of the injection fluid expressed by effective salinity $C_{se}$ and density $\rho_{sol}$, and where the pore volume $\phi V$ may be measured between an injection well and a production well. Thus, the left-hand side of Equation 1 may represent the polymer adsorption potential and the right-hand side may represent the polymer mass carried in an injection fluid slug of size A.

Solving Equation 1 for A (as in Equation 2) may provide the volume of aqueous polymer preflush fluid required to satisfy the formation adsorption potential throughout the porous medium of a formation having substantially homogenous permeability, thereby allowing propagation of the remaining aqueous polymer displacement fluid flood without polymer adsorption:

$$A = \frac{f(C_{se})}{C_p(C_{se})} * \frac{(1-\phi)}{\phi} * \frac{\rho_{rock}}{\rho_{sol}} \quad [2]$$

Polymer adsorption (f) and polymer concentration ($C_p$) may decrease with a decrease in ionic content ($C_{se}$) of the injection fluid. Without intending to be limited by theory, the formation surface may be negatively-charged and tend to repel the anionic polymer in the injection fluid. Increased salinity of the injection fluid may tend to reduce this repulsive force from the formation through increased ionic shielding, allowing greater interaction between the formation surface and the polymer resulting in increased adsorption of the polymer onto the formation.

The aqueous polymer preflush fluid may have a higher concentration of polymer than the aqueous polymer displacement fluid to more easily satisfy the polymer adsorption potential of the formation. As shown in eq. 2 above, the volume of aqueous polymer preflush fluid required to satisfy the polymer adsorption potential (A) is inversely proportional to the concentration of the polymer in the injected fluid (Cp). As such, the formation adsorption potential may be satisfied more quickly when the aqueous polymer preflush fluid contains a higher concentration of polymer than the aqueous polymer displacement fluid. The amount of polymer in the aqueous polymer preflush fluid may be from 200 ppm to 20000 ppm by weight of the aqueous polymer preflush fluid, preferably from 1000 ppmw to 10000 ppmw, or from 2000 ppmw to 5000 ppmw. The ratio of the amount of polymer in the aqueous polymer preflush fluid to the amount of polymer in the aqueous polymer displacement fluid may be from 3:2 to 100:1, or from 2:1 to 50:1.

The amount of polymer in the aqueous polymer preflush fluid may be selected to provide the aqueous polymer preflush fluid with a viscosity within an order of magnitude of the viscosity of the aqueous polymer displacement fluid. Preferably, the amount of polymer in the aqueous polymer preflush fluid is selected to provide the aqueous polymer preflush fluid with a viscosity that is slightly less, substantially the same, equal to, or slightly greater than the viscosity of the aqueous polymer displacement fluid. The amount of polymer required to provide the aqueous polymer preflush fluid with a selected viscosity may be dependent on the TDS content of the aqueous polymer preflush fluid.

The aqueous polymer preflush fluid may have a higher salinity, as TDS content, than the aqueous polymer displacement fluid. The higher salinity aqueous polymer preflush fluid requires a greater concentration of polymer relative to the aqueous polymer displacement fluid to provide the same viscosity at the same conditions, therefore, the aqueous polymer preflush fluid may have a TDS content that is greater than, or is significantly greater than, the aqueous polymer displacement fluid. As a result, the volume (A) of the higher salinity aqueous polymer preflush fluid needed to satisfy the formation polymer adsorption potential will be less than the volume (A) of the lower salinity aqueous polymer displacement fluid needed to satisfy the formation polymer adsorption potential.

The TDS content of the aqueous polymer preflush fluid may be selected based upon the desired viscosity of the aqueous polymer preflush fluid, the desired concentration of polymer used in the aqueous polymer preflush fluid, and formation characteristics. In certain embodiments, the aqueous polymer preflush fluid may have a TDS content of from 5000 mg/l to 200,000 mg/l. The aqueous polymer preflush fluid salinity may be selected relative to the aqueous polymer displacement fluid salinity. The ratio of the aqueous polymer preflush fluid TDS content to aqueous polymer displacement fluid TDS content may be from 9:1 to 5:4, or from 4:1 to 4:3. For example, in certain embodiments, the TDS content of the aqueous polymer displacement fluid may be from 10% to 80% of the aqueous polymer preflush fluid TDS content, or the TDS content in the aqueous polymer displacement fluid may be from 25% to 75% of the aqueous polymer preflush fluid TDS content. In certain embodiments, the aqueous polymer displacement fluid TDS content may be up to 50% of the aqueous polymer preflush fluid TDS content. For example, in a case where the aqueous polymer preflush fluid TDS content is 40,000 mg/l and the aqueous polymer displacement fluid TDS content is up to 50% of the aqueous polymer preflush fluid TDS content, then the aqueous polymer displacement fluid may have a TDS content of less than or equal to about 20,000 mg/l.

The aqueous polymer preflush fluid and the aqueous polymer displacement fluid may contain little or no surfactants (i.e. the aqueous polymer preflush fluid and the aqueous polymer displacement fluid are not utilized in a surfactant-polymer enhanced oil recovery process). Preferably the aqueous polymer preflush fluid is free of, or is absent, a surfactant. Preferably the aqueous polymer displacement fluid is free of, or is absent, a surfactant.

Referring now to FIG. 1, an oil production system 100 is illustrated, according to certain embodiments. The oil production system 100 may comprise at least one production well 112 traversing at least one formation 106 containing hydrocarbons. The production well 112 may comprise a plurality of openings 114 to allow fluid and/or gas to flow from the formation 106 and into the production well 112. A production facility 110 may be connected to the at least one well 112 and configured to receive fluid and/or gas produced from the at least one production well 112. In certain embodiments, the production facility 110 may separate produced hydrocarbons, produced water, and/or a produced aqueous polymer fluid delivered to the production facility from the production well 112, where produced hydrocarbons may be sent to at least one hydrocarbon storage 116, separated water may be sent to a produced water storage 118, and produced aqueous polymer fluid may be sent to a produced polymer fluid storage 130.

The oil production system 100 may further comprise at least one injection well 132, which may comprise a plurality of openings 134 through which a fluid may be injected from the injection well into the formation 106. A fluid may be injected into the formation 106 through the plurality of openings 134 in the injection well 132. The injected fluid may displace hydrocarbons within the formation 106 toward the production well 112, aiding in the flow of hydrocarbons into the production well 112.

A selected volume of the aqueous polymer preflush fluid, as described above, may be injected into the formation 106 through the injection well 132. The aqueous polymer preflush fluid may be injected into the formation through the injection well 132 using one or more pumps, injectors, or any other device suitable for directing fluid into the injection well.

The volume of the aqueous polymer preflush fluid injected into the formation 106 may be selected to satisfy at least a portion of the polymer adsorption potential of the formation, and preferably substantially all, or all, of the polymer adsorption potential of the formation between the injection well 132 and the production well 112. The volume of aqueous polymer preflush fluid necessary to satisfy the polymer adsorption potential of the formation between the injection well 132 and the production well 112 may be determined as described above. In certain embodiments, the injected aqueous polymer preflush fluid may have a volume of substantially A as calculated in equation 2 above. Injection of the aqueous polymer preflush fluid having volume A, followed by the aqueous polymer displacement fluid, may use substantially all of the aqueous polymer preflush fluid volume to satisfy the adsorption potential of the porous formation from the injection well to the production well.

After the aqueous polymer preflush fluid has been injected into the formation 106, the aqueous polymer displacement fluid, as described above, may be injected into the formation through the injection well 132. In certain embodiments, the same one or more pumps, injector, and/or other injection mechanism used to inject the aqueous polymer preflush fluid may be used to inject the aqueous polymer displacement fluid into the formation 106 through the injection well 132. As such, the aqueous polymer preflush fluid may saturate a segment of formation before the subsequent aqueous polymer displacement fluid reaches the saturated formation segment. Since the formation has already reached the saturation point for the polymer, substantially no polymer may be adsorbed from the aqueous polymer displacement fluid into the saturated formation.

The volume of aqueous polymer displacement fluid introduced into the formation should be sufficient to displace at least a portion, preferably a substantial portion, of the hydrocarbons present in the formation to the production well. The volume of the aqueous polymer displacement fluid introduced into the formation may range from 0.2 pore volumes up to 10 pore volumes of the formation between the injection well and the production well, or from 0.5 pore volumes up to 5 pore volumes between the injection well and the production well, where a pore volume between the injection well and the production well may be determined in accordance with methods well known in the art.

As discussed above, the aqueous polymer preflush fluid may be selected to have a higher TDS content and a higher polymer concentration than the aqueous polymer displacement fluid. The aqueous polymer preflush fluid may have a higher polymer adsorption potential in the formation than the aqueous polymer displacement fluid due to its higher TDS content, and the aqueous polymer preflush fluid may have more polymer available for adsorption onto the formation surface than the aqueous polymer displacement fluid due to its higher polymer concentration.

The aqueous polymer displacement fluid may follow the aqueous polymer preflush fluid through the formation. The aqueous polymer preflush fluid may be stably displaced by the aqueous polymer displacement fluid slug to keep the aqueous polymer preflush fluid ahead of the aqueous polymer displacement fluid. In certain embodiments, the aqueous polymer displacement fluid may have a viscosity of from 0.8 to 1.2 times, preferably from 1.0 to 1.2 times, the viscosity of the aqueous polymer preflush fluid to provide stable displacement of the aqueous polymer preflush fluid as the aqueous polymer displacement fluid proceeds through the formation. Channeling of aqueous polymer displacement fluid through the aqueous polymer preflush fluid may be substantially reduced, for example, by using an aqueous polymer preflush fluid with a viscosity equal to or slightly less than the aqueous polymer displacement fluid viscosity.

In certain embodiments, a plurality of aqueous polymer displacement fluid slugs may be injected consecutively into the formation following injection of the aqueous polymer preflush fluid. Each of the plurality of aqueous polymer displacement fluid slugs may have a different viscosity. For example, the viscosity of the aqueous polymer displacement fluid slugs may decrease successively where each aqueous polymer displacement fluid slug may have a lower viscosity than the preceding aqueous polymer displacement fluid slug. As such, although the first of the plurality of aqueous polymer displacement fluid slugs may have an equivalent or higher viscosity than the aqueous polymer preflush fluid, the last aqueous polymer displacement fluid slug in the series may have a lower viscosity than the initial aqueous polymer preflush fluid. In addition, each of the plurality of aqueous polymer displacement fluid slugs may have a varied volume. For example, each aqueous polymer displacement fluid slug may have a volume of 0.3 to 5 formation pore volumes, or 0.5 to 2 formation pore volumes, or 0.6 to 1.5 pore volumes, or 0.8 to 1.2 pore volumes.

Mixing at an interface between the aqueous polymer preflush fluid and the aqueous polymer displacement fluid may cause a decrease in the viscosity of the aqueous polymer displacement fluid. In certain embodiments, mixing at the interface may be reduced by ensuring that the aqueous polymer displacement fluid displaces the aqueous polymer preflush fluid in a stable manner, such as by controlling the viscosity of the aqueous polymer displacement fluid relative to the aqueous polymer preflush as described above. In addition, in certain embodiments, a low divalent ion concentration in the aqueous polymer preflush fluid may decrease viscosity reduction caused by mixing between the aqueous polymer preflush fluid and the aqueous polymer displacement fluid.

Figure 2:
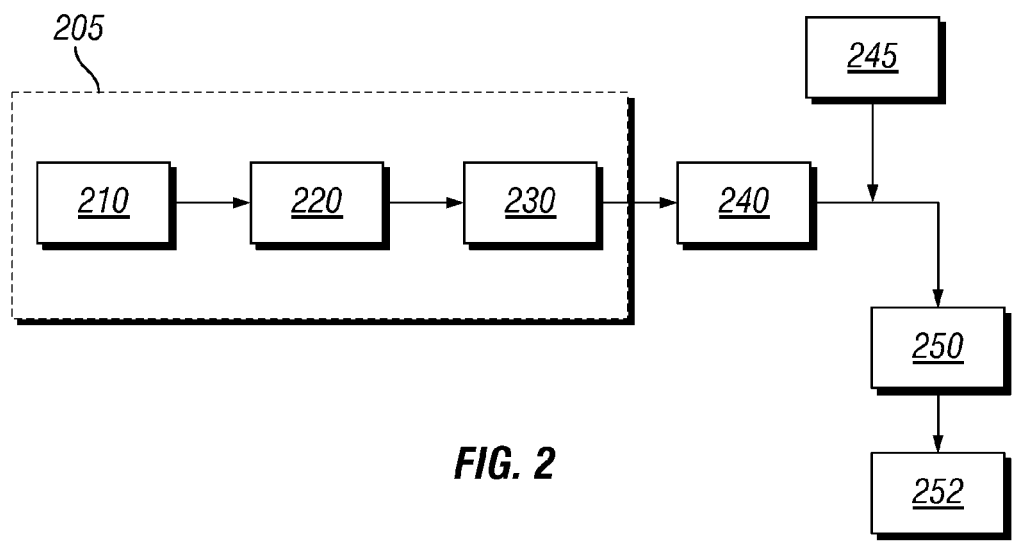
FIG. 2 illustrates steps of a method of producing and injecting injection fluid into a formation, according to aspects of the present disclosure.

Referring now to FIG. 2, a method for injection fluid flooding is illustrated according to certain embodiments. A water production step 205 may provide and process water for use in the aqueous polymer preflush fluid and/or the aqueous polymer displacement fluid. The water production step 205 may comprise an unprocessed water input 210 and a water processing step 220. The water production step 205 may further comprise an optional oxygen removal step 230. The unprocessed water input 210 may provide a source water from any suitable or accessible water source. For example, the source water may be seawater, aquifer water, produced water, fresh water, river water, lake water, brackish water, brine, and/or water from any accessible water source. For example, the source water for the unprocessed water input 210 may be obtained from a body of water, from a well, seawater, city water supply, and/or another water supply.

The source water may then be supplied to the water processing step 220, where the source water may be filtered and/or treated to produce processed water. The water processing step 220 may comprise removing ions from the source water with a primary filtration unit. In certain embodiments, the primary filtration unit may have at least two configurations: an aqueous polymer preflush fluid configuration and an aqueous polymer displacement fluid configuration (corresponding to an aqueous polymer preflush phase and an aqueous polymer displacement phase, respectively). In the aqueous polymer preflush configuration, the primary filtration unit may selectively remove divalent ions from the source water. In certain embodiments, in the aqueous polymer preflush configuration, the primary filtration unit may be a nano-filtration (NF) unit. For example, in the aqueous polymer preflush configuration, the primary filtration unit may remove from about 60 to about 99% of the divalent ions from the source water, including magnesium (Mg), calcium (Ca), iron (Fe) and/or strontium (Sr) ions, without removing a substantial quantity (e.g. greater than 30%, or greater than 40%, or greater than 50%, or greater than 60%, or greater than 70%) of the monovalent ions from the source water.

In the aqueous polymer displacement fluid configuration, the primary filtration unit may remove monovalent ions and/or divalent ions from the source water. In certain embodiments, in the aqueous polymer displacement fluid configuration, the primary filtration unit may be a reverse osmosis (RO) unit. For example, in the aqueous polymer displacement fluid configuration, the primary filtration unit may remove from about 60 to about 99% of the ions from the source water.

In certain embodiments, the primary filtration unit may be an NF unit during the aqueous polymer preflush phase and an NF unit followed by an RO unit during the aqueous polymer displacement phase. For example, before the aqueous polymer preflush phase begins, NF membrane components may be installed in the primary filtration unit and between the aqueous polymer preflush phase and the aqueous polymer displacement phase RO membrane components may be installed to process water produced by NF filtration. In certain embodiments, separate filtration units may be used as the NF unit and the RO unit in the corresponding aqueous polymer preflush and aqueous polymer displacement phases.

In certain embodiments, oxygen may be optionally removed from the processed water produced by the primary filtration in step 230. For example, in certain embodiments, oxygen may be removed by a mechanical removal process, such as with a vacuum tower, and/or by a chemical removal process, with an oxygen scavenging agent such as a sulfite. In certain embodiments, substantially all of the oxygen may be removed from the processed water. For example, after oxygen removal, the amount of oxygen left in the water may be reduced to about 10 ppb to about 100 ppb.

A polymer unit may add a polymer additive to the processed water at step 245 to produce a polymer fluid. The polymer additive may be in a powder form or in a polymer solution form. Polymer solution additive may have a polymer concentration determined by the amount of polymer per volume of polymer solution additive. In certain embodiments, the polymer additive may be mixed and/or blended with the processed water to produce the polymer fluid using a mixer unit. At step 240, the polymer fluid may be injected into at least one injection well 250 and into the formation 252 by at least one pump. In some embodiments, the polymer additive may be added to the processed water to create the polymer fluid before the processed water is injected into the at least one injection well 250. In some embodiments, the polymer additive may be added to the processed water as it is injected into the injection well 250 by the at least one pump.

During the aqueous polymer preflush phase, the aqueous polymer preflush may comprise the polymer fluid with a high concentration of polymer, as discussed above. In certain embodiments, to produce the polymer fluid, the polymer unit may add a high dosage of polymer per unit volume of processed water. The polymer dosage may be defined as the polymer concentration of the polymer additive multiplied by the volumetric flowrate of the polymer additive. For example, during the aqueous polymer preflush phase, the polymer unit may add about 0.5 kg/hr to 50,000 kg/hr of polymer to create the aqueous polymer preflush, where the flow rate of aqueous polymer preflush may be about 400 bbl/day to about 400,000 bbl/day, depending on the properties of the formation. As a result, the aqueous polymer preflush fluid may have a polymer concentration of 200 mg/l to 20,000 mg/l.

During the aqueous polymer displacement phase, the aqueous polymer displacement fluid may comprise the polymer fluid having a lower concentration of polymer, as discussed above. During the aqueous polymer displacement phase, the polymer unit may add a lower dosage of polymer additive per unit volume of processed water than added during the aqueous polymer preflush phase. For example, during the aqueous polymer displacement phase, the polymer unit may add about 0.1 kg/hr to about 10,000 kg/hr of polymer to create the aqueous polymer displacement fluid. For example, as a result, the aqueous polymer displacement fluid may have a polymer concentration of about 50 mg/l to about 5,000 mg/l. As such, the aqueous polymer displacement fluid may have a lower polymer concentration than the aqueous polymer preflush fluid.

Figure 3:
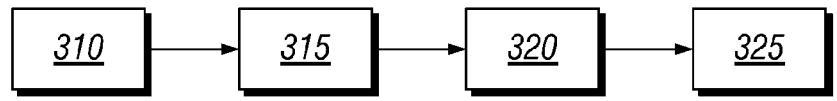
FIG. 3 illustrates a method of injecting fluid into a formation in multiple phases, according to aspects of the present disclosure.

Referring now to FIG. 3, a system of producing hydrocarbons is shown, according to certain embodiments. At step 310, the system may be in the aqueous polymer preflush phase (where the primary filtration unit may be an NF unit and the polymer unit may inject the high dosage of polymer into the processed water to produce the aqueous polymer preflush fluid). The aqueous polymer preflush fluid may be injected into the formation through an injection well. Once selected volume of aqueous polymer preflush has been injected into the injection well, at step 315 the system may switch from the aqueous polymer preflush phase to the aqueous polymer displacement phase. As discussed above, the selected volume of aqueous polymer preflush fluid may be equal to the volume of aqueous polymer preflush fluid required to satisfy the polymer adsorption potential of the formation between the injection well and a production well. At step 320, aqueous polymer displacement fluid may be injected into the formation through the injection well after injection of the aqueous polymer preflush fluid. The aqueous polymer displacement fluid may drive hydrocarbons and the aqueous polymer preflush fluid through the formation to the production well. As the aqueous polymer displacement fluid displaces the preceding aqueous polymer preflush fluid slug through the formation, polymer from the aqueous polymer preflush fluid slug may adsorb on to the formation. In certain embodiments, the amount of polymer adsorbed from the aqueous polymer preflush fluid onto the formation may be sufficient to satisfy the adsorption potential of a given portion of formation. As such, at the point that the aqueous polymer displacement fluid displaces the preceding aqueous polymer preflush fluid slug past a given portion of the formation, substantially no polymer may adsorb from the aqueous polymer displacement fluid to the given portion of the formation.

At step 325, a produced fluid comprising hydrocarbons may be produced through the production well to the production facility. In certain embodiments, the produced fluid may further comprise water and polymer. The production facility may separate produced hydrocarbons from water and polymer, and send the water and polymer to an injection fluid storage for reuse and/or disposal. The aqueous polymer displacement fluid may be injected until the injection operation is complete, for example until hydrocarbon production substantially ceases, as would be appreciated by one of ordinary skill in the art with the benefit of the present disclosure.

Depending on the needs of the operation, the amount of aqueous polymer preflush fluid injected into the formation may be less than required to completely satisfy the polymer adsorption potential of the formation. If a smaller amount of aqueous polymer preflush fluid is used than required to satisfy polymer adsorption, polymer from the aqueous polymer displacement fluid may be adsorbed to satisfy the formation adsorption potential.

In addition, a greater amount of aqueous polymer preflush fluid may be injected than that amount required to satisfy the adsorption potential of the formation. If a greater amount of aqueous polymer preflush fluid is injected than that adsorbed by the formation, then remaining aqueous polymer preflush fluid may be produced into the at least one production well.

For a heterogeneous reservoir (comprising multiple layers having substantially contrasting permeabilities), the aqueous polymer preflush fluid may satisfy the polymer adsorption potential of one layer faster than other layers. In this case, an efficiency trade-off may be made between continuing to inject aqueous polymer preflush fluid through layers with lower permeability (while excess aqueous polymer preflush fluid flows through layers with higher permeability), and switching to the aqueous polymer displacement fluid before having satisfied the polymer adsorption potential completely in the lower permeability layers. As such, in certain embodiments, once the aqueous polymer preflush fluid satisfies the adsorption potential in one layer (or more than one layer if there are several layers with relatively high permeability), the injection system may be switched to the aqueous polymer displacement phase.

The present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method comprising:
    injecting a volume of an aqueous polymer preflush fluid having a total dissolved solids content into a formation comprising hydrocarbons via an injection well extending into the formation, wherein the aqueous polymer preflush fluid comprises water-dispersible ionically charged viscosifying polymer;
    after injecting the aqueous polymer preflush fluid into the formation, injecting an aqueous polymer displacement fluid having a total dissolved solids content into the formation through the injection well, wherein the aqueous polymer displacement fluid comprises water-dispersible ionically charged viscosifying polymer,
    wherein the total dissolved solids content and the polymer concentration of the aqueous polymer preflush fluid is greater than the total dissolved solids content and polymer concentration of the aqueous polymer displacement fluid; and producing a produced fluid comprising hydrocarbons from the formation through a production well.

2. The method of claim 1, wherein the amount of polymer present in the aqueous polymer preflush fluid is at least equal the polymer adsorbed in the formation between the injection well and the production well.

3. The method of claim 2, wherein the volume of aqueous polymer preflush fluid needed to introduce at least the amount of polymer adsorbed in the formation between the injection well and the production well is substantially equal to A, wherein A is defined by the following equation:

$$A = \frac{f(C_{se})}{C_p(C_{se})} * \frac{(1-\phi)}{\phi} * \frac{\rho_{rock}}{\rho_{sol}}$$

wherein $f(C_{se})$ is the polymer adsorption capacity (in kg of polymer adsorbed per kg rock) at the effective salinity of the aqueous polymer preflush fluid, $C_p(C_{se})$ is the polymer concentration in the aqueous polymer preflush fluid at the effective salinity of the aqueous polymer preflush fluid, $\phi$ is the porosity of the formation, $\rho_{rock}$ is the rock density of the formation, and $\rho_{sol}$ is the density of the aqueous polymer preflush fluid.

4. The method of claim 1, wherein producing the produced fluid comprises producing the hydrocarbon-containing compound and a polymer.

5. The method of claim 1, wherein injecting a selected volume of aqueous polymer preflush fluid into the injection well further comprises adsorbing an amount of polymer on to the formation.

6. The method of claim 1, further comprising displacing a volume of the hydrocarbon-containing compound toward the production well with the aqueous polymer displacement fluid.

7. The method of claim 1, wherein the aqueous polymer preflush fluid has a total dissolved solids content of from 5000 mg/l to 200,000 mg/l.

8. The method of claim 1, wherein the aqueous polymer displacement fluid has a total dissolved solids content of up to 50% of the total dissolved solids content of the aqueous polymer preflush fluid.

9. The method of claim 1, wherein the viscosity of the aqueous polymer displacement fluid is greater than the viscosity of the aqueous polymer preflush fluid.

10. The method of claim 1, wherein the viscosity of the aqueous polymer displacement fluid is from 1.0 to 1.2 times the viscosity of the aqueous polymer preflush fluid.

11. The method of claim 1, wherein the aqueous polymer preflush fluid is free of a surfactant.

12. The method of claim 1, wherein the aqueous polymer displacement fluid is free of a surfactant.

13. The method of claim 1, wherein the aqueous polymer preflush fluid is provided by removing divalent ions from a source water and mixing a polymer with the source water from which divalent ions have been removed.

14. The method of claim 1, wherein the formation comprises a first layer having a first permeability and a second layer having a second permeability, wherein the first permeability is greater than the second permeability.

* * * * *